United States Patent
Garritsen et al.

(10) Patent No.: US 6,732,222 B1
(45) Date of Patent: May 4, 2004

(54) METHOD FOR PERFORMING FLASH MEMORY FILE MANAGEMENT

(75) Inventors: Frido Garritsen, Hayward, CA (US); Brian Y. Huang, Union City, CA (US)

(73) Assignee: Silicon Motion, Inc., San Jose, CA (US)

(*) Notice: Subject to any disclaimer, the term of this patent is extended or adjusted under 35 U.S.C. 154(b) by 256 days.

(21) Appl. No.: 10/062,323

(22) Filed: Feb. 1, 2002

(51) Int. Cl.[7] .............................................. G06F 12/00
(52) U.S. Cl. ....................................... 711/103; 711/202
(58) Field of Search ................................ 711/103, 202

(56) References Cited

U.S. PATENT DOCUMENTS

| | | | | |
|---|---|---|---|---|
| 5,630,093 A | * | 5/1997 | Holzhammer et al. ....... | 711/115 |
| 5,717,886 A | * | 2/1998 | Miyauchi .................... | 711/103 |
| 5,740,396 A | * | 4/1998 | Mason ........................ | 711/103 |
| 5,742,934 A | * | 4/1998 | Shinohara ................... | 711/103 |
| 6,141,249 A | * | 10/2000 | Estakhri et al. ......... | 365/185.11 |
| 6,385,690 B1 | * | 5/2002 | Iida et al. .................... | 711/103 |
| 2002/0085416 A1 | * | 7/2002 | Yamagami et al. .... | 365/185.09 |
| 2003/0097520 A1 | * | 5/2003 | Lai et al. .................... | 711/103 |

* cited by examiner

Primary Examiner—Kevin Verbrugge
(74) Attorney, Agent, or Firm—Blakely, Sokoloff, Taylor & Zafman LLP

(57) ABSTRACT

According to one aspect of the invention, there is provided a method for accessing data in a memory to be performed. The method includes receiving a request to read a file stored in the memory, the memory having a fragmented array of files across a single partition. The method also includes building a look up table (LUT) for the memory. The method also includes storing the LUT in the processor. The method also includes accessing the LUT in the processor to create an index table which specifies a plurality of addresses for the file. The method further includes storing the index table in the memory.

46 Claims, 5 Drawing Sheets

METHOD FOR PERFORMING FLASH MEMORY FILE MANAGEMENT

FIELD OF THE INVENTION

The invention relates generally to a method of managing files stored on a flash memory.

BACKGROUND OF THE INVENTION

The affordable portable devices (e.g. MP3 players) currently available will not recognize the FAT file system of the flash memory (e.g. SmartMedia). Some of the more expensive devices may support the FAT file system by using more memory and a faster memory controller. Today one cannot simply copy files to a smartmedia and plug it into a portable device or exchange smartmedia cards with friends who have copied MP3 files from their hard drive to the smartmedia cards. One must ensure that preparation and copying of the files to the smartmedia is done using software which is compatible with the proprietary software used on the portable device.

FIG. 1 illustrates a method of using a flash memory attached to a portable device. In order to use a flash memory (e.g. SmartMedia) with a portable device (e.g. MP3 audio player), a user must first ensure 101 that they have a PC which is loaded with proprietary software associated with the portable device. Portable devices are unable to recognize files on a flash memory unless the portable device was loaded with proprietary software associated with the portable device. The user must then access 102 the PC's proprietary software. Next, the user needs to connect 103 the flash memory associated with the portable device to the PC.

After accessing the proprietary software and connecting the flash memory, using the proprietary software, audio files on the PC (e.g. harddrive) which the user wishes to load to the flash memory may be accessed 104. The files will be processed 105 using the proprietary software. By processing, the files will be organized on the flash memory so that the associated software on the portable device (e.g. MP3 player) using the flash memory (e.g. SmartMedia) will have the ability to read the files (e.g. play a song).

After processing the files, the user will need to use the proprietary software on the PC to load 106 the flash memory with the files (e.g. MP3 audio files) from the PC. The user may then disconnect 107 the flash memory from the PC and reattach it to the portable device. The portable device may now read 108 (e.g. play a song) the files on the flash memory which have been processed and loaded by the PC's associated proprietary software.

A PC which uses a flash memory (e.g. SmartMedia) might have less difficulty in reading from flash memory or writing to flash memory than a portable device. This is due to the PC's ability to quickly determine where on the flash memory each file is stored. The CPU simply caches portions (e.g. 2 mb) of the flash memory (e.g. SmartMedia) to system memory (e.g. RAM). The CPU would then map logical and physical addresses to enable the file to be read. A portable device differs in that it does not have the power or ability to perform the caching operation. Furthermore, the PC uses an operating system (e.g. Windows 98) and a device driver to access the flash memory. Portable devices such as MP3 players do not need or have operating systems or expensive RAM. Portable devices need the ability to quickly recognize all of the files on a flash memory. This ability should not be limited to files which were loaded with a specific type of proprietary software. Also, this ability should not require installing additional RAM which can drastically increase the price of the portable device.

SUMMARY OF THE INVENTION

According to one aspect of the invention, there is provided a method for accessing data in a memory to be performed. The method includes receiving a request to read a file stored in the memory, the memory having a fragmented array of files across a single partition. The method also includes building a look up table (LUT) for the memory. The method also includes storing the LUT in the processor. The method also includes accessing the LUT in the processor to create an index table which specifies a plurality of addresses for the file. The method further includes storing the index table in the memory.

DETAILED DESCRIPTION

Figure 1:
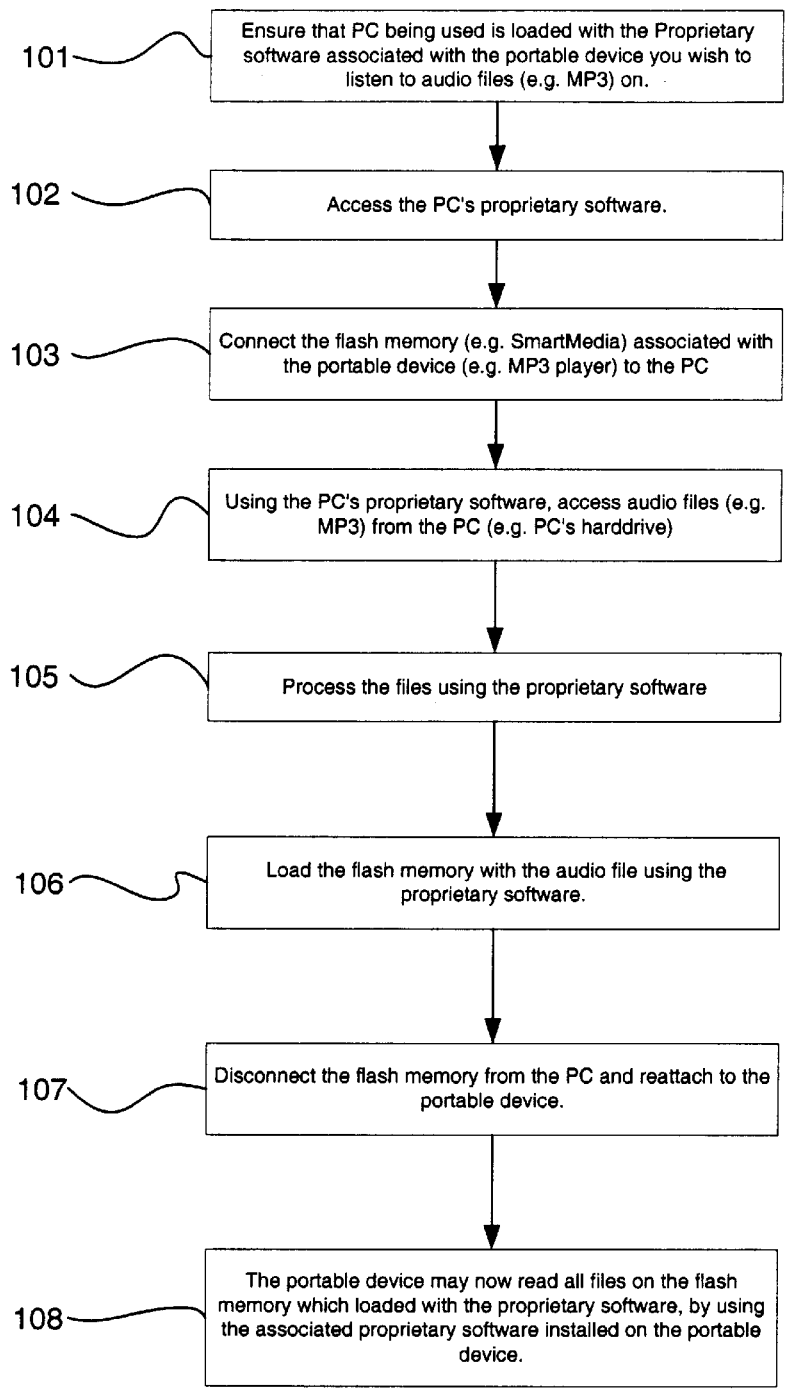
FIG. 1 illustrates an embodiment of a method of using a flash memory attached to a portable device.

Embodiments of the present invention (as described below as well as others) may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 4:
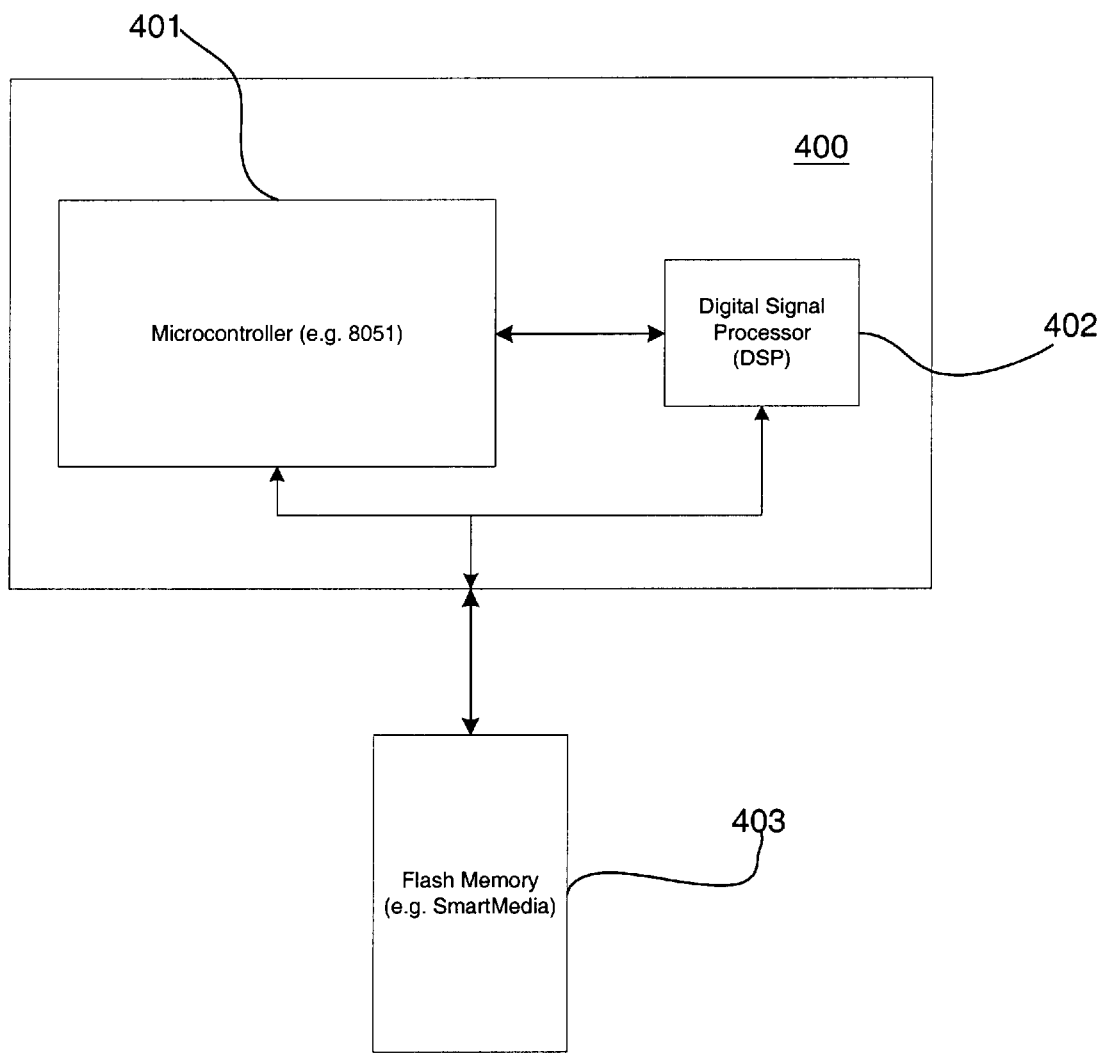
FIG. 4 illustrates an embodiment of an audio device and attached flash memory (e.g. SmartMedia), the audio device to play and store audio files from the flash memory

FIG. 4 shows one embodiment of an audio device and attached flash memory (e.g. SmartMedia). The audio device is designed to play and store audio files from the flash memory. The audio device 400 includes a micro-controller (e.g. 8051) 401 coupled to a Digital Signal Processor (DSP) 402. Also, a flash memory 403 is coupled to the audio device. One device may be coupled directly to another device, or coupled indirectly, through connections, a common device, or chain of devices.

SmartMedia, was originally developed by the Toshiba corporation. SmartMedia cards are available in a variety of capacities (e.g. 2 MB, 64 MB). SmartMedia cards are quite small, approximately 45 mm long, 37 mm wide and less than 1 mm thick. SmartMedia cards are elegant in their simplicity. A plane electrode is connected to the Flash-memory chip by bonding wires. The Flash-memory chip, plane electrode and bonding wires are embedded in a resin using a technique called over-molded thin package (OMTP). This allows everything to be integrated into a single package without the need for soldering.

The OMTP module is glued to a base card to create the actual card. Power and data is carried by the electrode to the Flash-memory chip when the card is inserted into a device. A notched corner indicates the power requirements of the SmartMedia card. Looking at the card with the electrode facing up, if the notch is on the left side, the card needs 5 volts. If the notch is on the right side, it requires 3.3 volts. SmartMedia cards erase, write and read memory in small blocks (256 or 512 byte increments). This approach means that they are capable of fast, reliable performance while allowing one to specify what data to keep. They are small, lightweight and easy to use. They are typically less rugged than other forms of removable solid-state storage.

Figure 2:
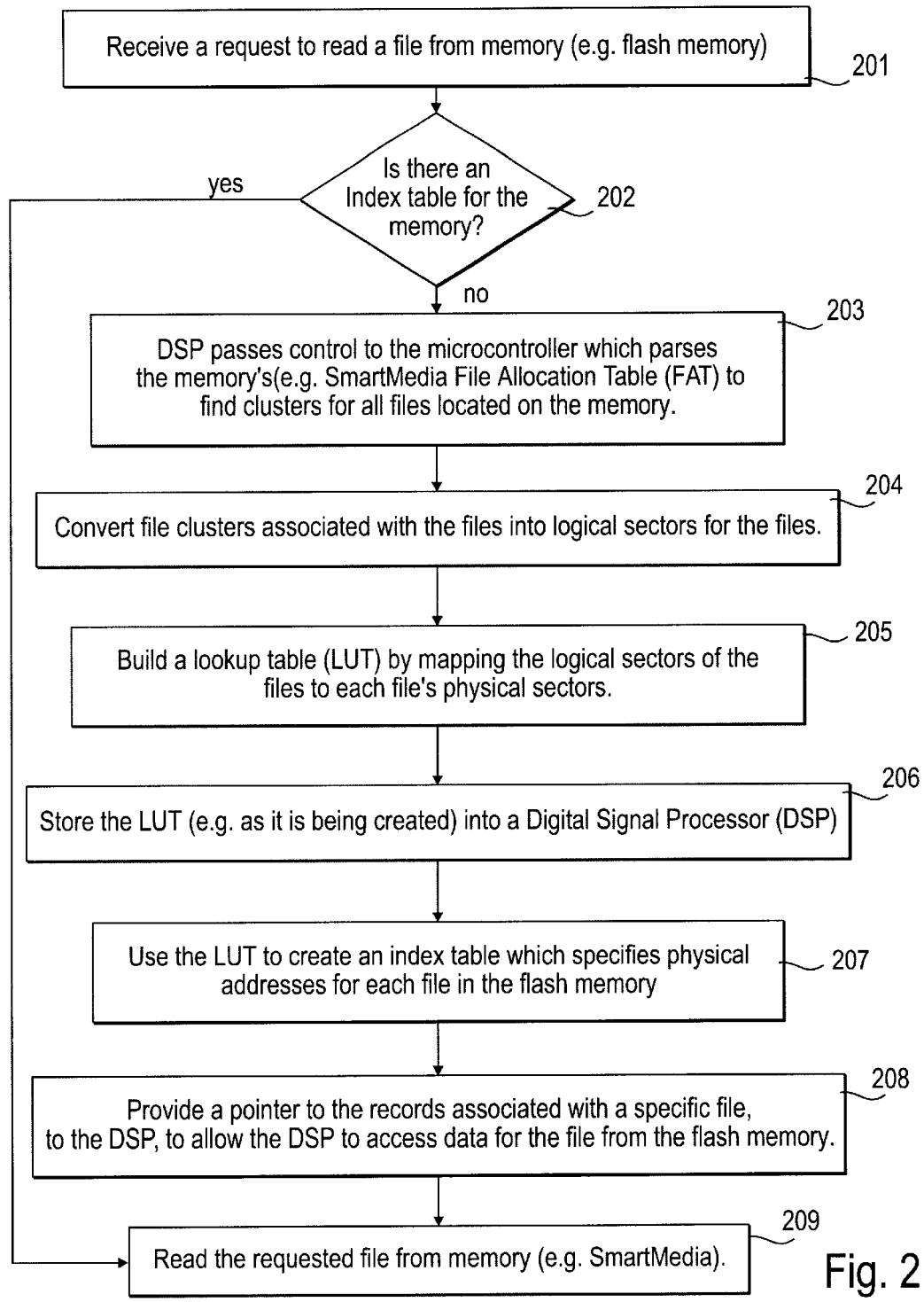
FIG. 2 illustrates an embodiment of a method according to the present invention, for reading files from a flash memory utilizing an audio device.

FIG. 2 illustrates an embodiment of a method according to the present invention, for reading files from a flash memory utilizing an audio device 400. The method 200 begins in block 201 in which a request is received at an audio device 400 to read a file from a flash memory 403. This may involve a user pressing a play button on keypad, where the keypad is attached to the audio device 400. In one example the audio device may be included within a portable MP3 player. In an alternate embodiment, the audio device 400 may exist within a personal computer system. In an exemplary embodiment, the files to be read may be MP3 files, WMA files, AAC files, or CD audio format files for example.

In block 202, a determination is made as to whether there is an index table for the flash memory 403. If an index table exists at block 202 then block 209 in the method 200 will be performed. However, if in block 202 a determination is made that there is not an index table, the process flows to block 203. Block 203 involves the audio device's 400 DSP 402 passing control of handling the request to the micro-controller 401. Block 203 typically also includes the micro-controller 401 parsing the memory's 403 file allocation table (FAT). Parsing the FAT involves locating all clusters associated with all of the files located on the memory 403. FAT is a table that an operating system uses to locate files on a disk. Due to fragmentation, a file may be divided into many sections that are scattered around the disk. The FAT keeps track of all these pieces. In DOS systems, FATs are stored in hidden files, called FAT files. The FAT system for older versions of Windows 95 is called VFAT, and the one for new versions of Windows 95 and Windows 98 is called FAT32. In an exemplary embodiment of the invention, FAT 32 is utilized. In alternate embodiments of the invention, VFAT is utilized.

In block 204, the file clusters associated with each file are converted into logical sectors. Typically, the FAT is a database that keeps track of every file on a hard disk. Under this system, the hard disk is divided into 512-byte pieces called sectors. The sectors are then grouped into larger pieces called clusters.

The structure that gives the FAT file system its name is the file allocation table. In order to understand what this important table does, one must first understand how space on the hard disk is allocated under operating systems that use FAT family file systems (including DOS and most versions of Windows.)

Data is stored in individual 512-byte sectors on the hard disk. In theory, it is possible for each file to be allocated to a number of individual sectors, and this is in fact done for some file systems (such as HPFS.) However, for performance reasons, individual sectors are not allocated to files in the FAT system. The reason is that it would take a lot of overhead (time and space) to keep track of pieces of files that were this small: a 10 GB disk partition has 20,000,000 sectors! The hard disk is instead broken into larger pieces called clusters, or alternatively, allocation units. Each cluster contains a number of sectors. Typically, clusters range in size from 2,048 bytes to 32,768 bytes, which corresponds to 4 to 64 sectors each.

The file allocation table is where information about clusters is stored. Each cluster has an entry in the FAT that describes how it is used. This is what tells the operating system which parts of the disk are currently used by files, and which are free for use. The FAT entries are used by the operating system to chain together clusters to form files. This chaining process is described here. The file allocation tables are stored in the area of the disk immediately following the volume boot sector.

The FAT groups sectors into larger blocks called clusters. The cluster size is determined primarily by the size of the disk volume: generally, larger volumes use larger cluster sizes. For hard disk volumes, each cluster ranges in size from 4 sectors (2,048 bytes) to 64 sectors (32,768 bytes). In some situations 128-sector clusters may be used (65,536 bytes per cluster). Floppy disks use much smaller clusters, and in some cases use a cluster of size of just 1 sector. The sectors in a cluster are continuous, so each cluster is a continuous block of space on the disk.

Returning to FIG. 2. In Block 205, a lookup table (LUT) is created. Typically this involves the micro-controller 401 mapping the logical sectors (sectors) described earlier to their corresponding physical sectors. A physical sector refers to the actual location of the sector containing file data on a storage device. The logical sector refers to how the information appears to a program or user. In block 206, the LUT is stored to the DSP 402. This involves the micro-controller 401 storing the LUT to the DSP 402 as it is being created.

In block 207, the DSP 402 uses the LUT to create an index table which specifies physical addresses for each file in the flash memory. In block 208, pointers to the records associated with a specific file (e.g. MP3 audio file) are provided to the DSP 402. This typically involves an index table. The index table consists of the following information: physical sector, number of sectors, next physical sector, and number of sectors until end of file. Each file has one or more indices to locate its data on the storage medium. The pointer table consists of a physical sector and offset of file descriptor (e.g. file name). The pointer table provides a pointer into the index table to the data of an associated file. In block 209, the requested file is read from memory 403. Reading the file from memory 403 includes playing the audio file for the user.

Figure 3:
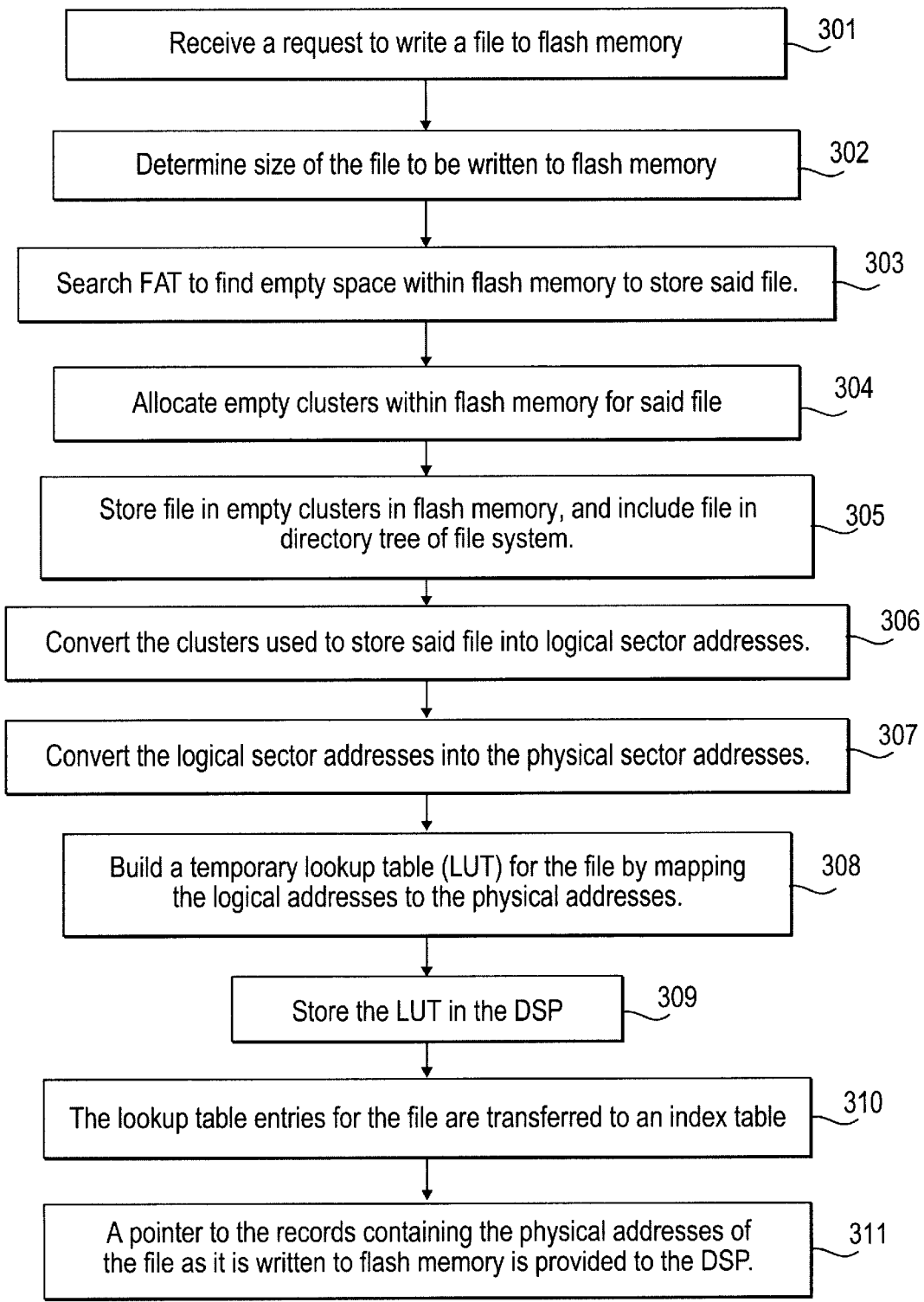
FIG. 3 illustrates an embodiment of a method according to the present invention for writing files to a flash memory.

FIG. 3 shows an embodiment of a method for writing files from a flash memory utilizing audio device 400 or a similar device according to the present invention. The method 300 begins in block 301 in which a request is received at an audio device 400 to read a file from a flash memory 403. In an exemplary embodiment, the micro-controller 401 receives the request. Block 301 typically involves a user choosing a record function on keypad, where the keypad is attached to the audio device 400. In one example the audio device 400 may be included within a portable MP3 player. In an alternate embodiment, the audio device 400 may exist within a personal computer system. In an exemplary embodiment, the files to be read may be MP3 files, WMA files, MC files, or CD audio format files. In block 302 the micro-controller 401 determines the size of the file to be written to flash memory. Typically, Block 302 involves the microcontroller pre-allocating a certain amount of space for each file section (e.g. pre-allocate blocks of 1 MB). After the entire file is written, the extra pre-allocated space is released.

In block 303, the flash memory's 403 FAT is searched to determine where there exists free space to store the file to be written to the flash memory 403. The micro-controller searches the FAT for empty clusters.

In block 304, empty clusters are allocated within the flash memory 403 for the file to be written to the flash memory 403. In block 305, the file is stored in empty clusters on the flash memory 403. Block 305 also typically involves including the file in a directory tree of the file system. In block 306, the clusters in which the file was stored in block 305 are converted into logical sector addresses. In block 307, the logical sector addresses are converted into physical sector addresses.

In Block 308, a lookup table (LUT) is created. Typically this involves the micro-controller 401 mapping the logical sectors (sectors) described earlier to their corresponding physical sectors. A physical sector refers to the actual location of the sector containing file data on a storage device. The logical sector refers to how the information appears to a program or user. In block 309, the LUT is stored to the DSP 402. This involves the micro-controller 401 storing the LUT to the DSP 402 as it is being created.

Figure 5:
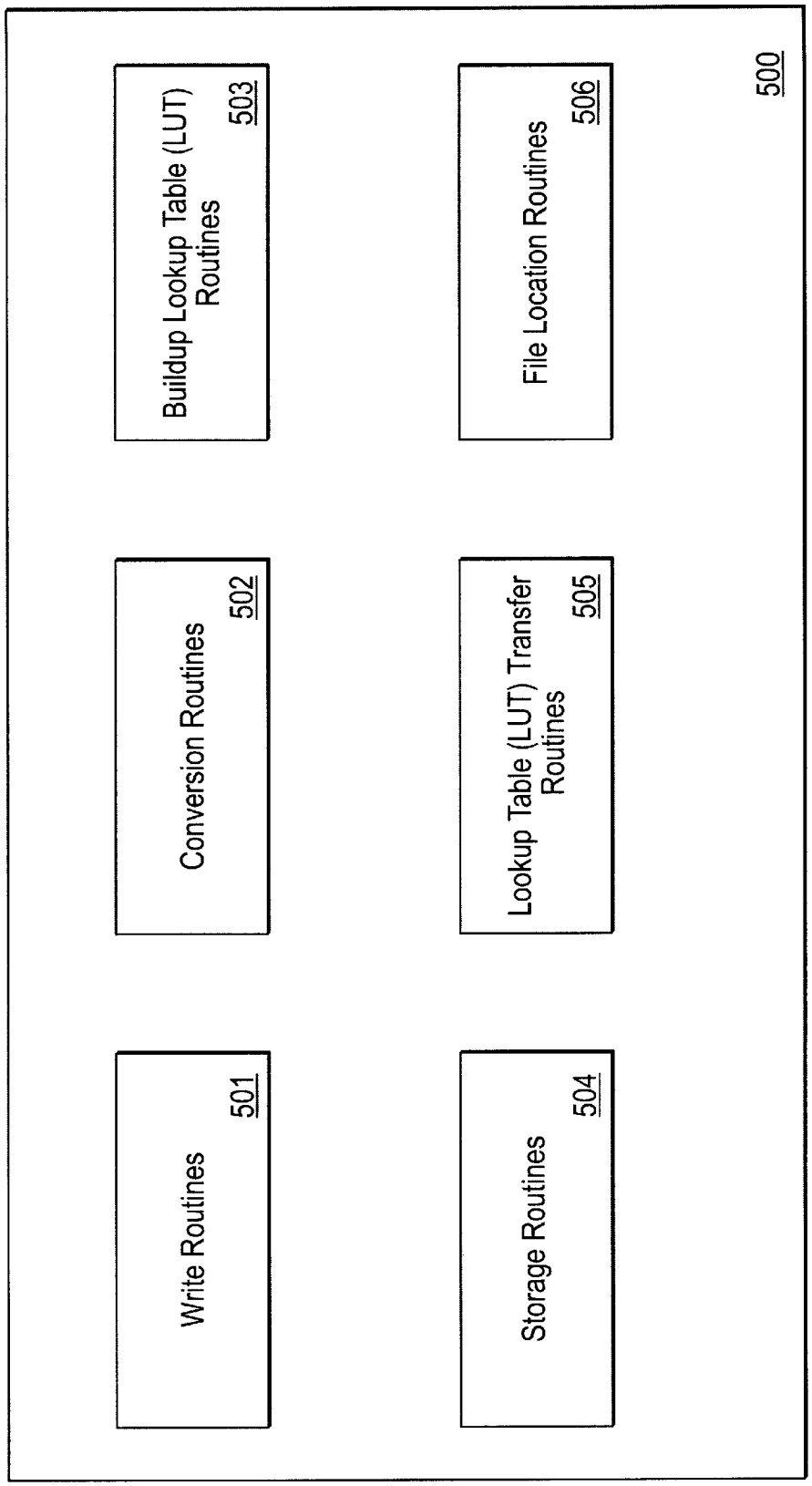
FIG. 5 illustrates an embodiment of a computer readable storage medium for an audio device which may be used in one aspect of the invention.

In block 310, the lookup table entries for the file are transferred to an index table. The index table is a table containing entries associated with each file located on the flash memory 403. The LUT created in block 308 provides physical addresses for all of the sectors in the file to be written to the flash memory 403. The physical addresses in the LUT are written to records in an index table. The records in which the physical addresses are written are further associated with the file to be written to the flash memory 403. The index table is a listing of all the files (e.g. MP3), which the audio device 400 can access for a user. In block 311, a pointer to the records containing the physical addresses of the file as it is written to flash memory 403 is provided to the DSP 402. FIG. 5 illustrates an embodiment of an audio device's computer readable storage medium 500 for an audio device which may be used in one aspect of the invention. The audio device's computer readable storage medium stores executable computer program instructions which cause an audio device to perform a method of the present invention. This medium includes software routines 501 to receive requests to write a file to a flash memory. The medium further includes write routines 501 which provide the necessary software to determine the size of a file, locate space to store the file, allocate clusters for storing the file, and to store the file in a flash memory. The write routines 501 also provide the necessary software for including the file in a directory tree of the flash memory's file system. The cluster conversion and sector conversion routines 502 provide the necessary software to convert the file clusters at which the file is stored to logical sector addresses, and to convert the logical sector addresses into physical sector addresses. The build a lookup table (LUT) and index table routines 503 include the necessary software to build a temporary LUT for a the file stored on a flash memory, by mapping the logical addresses to the physical addresses. Storage routines 504 include the necessary software for storing the LUT created by the build a LUT and index table routines into a DSP. LUT transfer routines 505 provide the necessary software for transferring the LUT entries for a file to an index table. File location routines 506 provide the necessary software for providing a DSP with a pointer to records containing the physical addresses from the LUT of the file written to the flash memory.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 4 may be integrated into components, or may be subdivided into components. Moreover, the blocks of FIGS. 2 and 3, for example, represent portions of a method, which, in some embodiments, may be reordered or may be organized in parallel rather than in a linear or step-wise fashion. The present specification and figures are accordingly to be regarded as illustrative rather than restrictive.

What is claimed is:

1. A method for a processor to access data in a memory, the method comprising:
   receiving a request to read a file stored in the memory, the memory having a fragmented array of files across a single partition;
   building a look up table (LUT) for the memory;
   storing at least temporarily the LUT in the processor;
   accessing the LUT in the processor to create an index table which specifies a plurality of addresses for the file;
   storing the index table in the memory.

2. A method as in claim 1 wherein the memory is a flash memory.

3. A method as in claim 1 wherein the memory is a SmartMedia.

4. A method as in claim 1 wherein building a lookup table comprises parsing the memory's File Allocation Table to find clusters for all files located on the memory.

5. A method as in claim 1 wherein building a lookup table comprises converting file clusters associated with a file into logical sectors.

6. A method as in claim 5 wherein building a lookup table further comprises mapping the logical sectors of the files to their corresponding physical sectors.

7. A method as in claim 1 wherein storing the LUT comprises storing the LUT into a Digital Signal Processor (DSP).

8. A method as in claim 1 wherein creating an index table comprises utilizing the LUT to create an index table which specifies physical addresses for each file.

9. A method as in claim 1 wherein the index table in the memory comprises a table of records readable by the processor.

10. A method as in claim 9 wherein the processor is a Digital Signal Processor.

11. A method for a processor to write data to a memory, the method comprising:
    receiving a request to write a file to the memory, the memory having a fragmented array of files across a single partition;
    determining the size of the file;
    writing the file to the memory;
    building a look up table (LUT) for the memory;
    storing at least temporarily the LUT in the processor;
    accessing the LUT in the processor to create an index table which specifies a plurality of addresses for the file;
    storing the index table in the memory.

12. A method as in claim 11 wherein the memory is a flash memory.

13. A method as in claim 11 wherein the memory is a SmartMedia.

14. A method as in claim 11 wherein writing the file to the memory comprises searching a file allocation table (FAT) to find empty space within the memory to store the file.

15. A method as in claim 11 wherein writing the file to the memory comprises allocating empty clusters within flash memory for the file.

16. A method as in claim 11 wherein writing the file to the memory comprises storing the file in empty clusters in the memory.

17. A method as in claim 11 wherein building a lookup table comprises parsing the memory's File Allocation Table to find clusters for all files located on the memory.

18. A method as in claim 11 wherein building a lookup table comprises converting file clusters associated with a file into logical sectors.

19. A method as in claim 18 wherein building a lookup table further comprises mapping the logical sectors of the files to their corresponding physical sectors.

20. A method as in claim 11 wherein storing the LUT comprises storing the LUT into a Digital Signal Processor (DSP).

21. A method as in claim 11 wherein creating an index table comprises utilizing the LUT to create an index table which specifies physical addresses for each file.

22. A method as in claim 11 wherein the index table in the memory comprises a table of records which can be read by a processor.

23. A method as in claim 22 wherein the processor is a Digital Signal Processor.

24. A computer readable storage medium containing executable computer program instructions which when executed cause a method for a processor to access data in a memory, the method comprising:
    receiving a request to read a file stored in the memory, the memory having a fragmented array of files across a single partition;
    building a look up table (LUT) for the memory;
    storing at least temporarily the LUT in the processor;
    accessing the LUT in the processor to create an index table which specifies a plurality of addresses for the file;
    storing the index table in the memory.

25. A computer readable storage medium as in claim 24 wherein the memory is a flash memory.

26. A computer readable storage medium as in claim 24 wherein the memory is a SmartMedia.

27. A computer readable storage medium as in claim 24 wherein building a lookup table comprises parsing the memory's File Allocation Table to find clusters for all files located on the memory.

28. A computer readable storage medium as in claim 24 wherein building a lookup table comprises converting file clusters associated with a file into logical sectors.

29. A computer readable storage medium as in claim 28 wherein building a lookup table further comprises mapping the logical sectors of the files to their corresponding physical sectors.

30. A computer readable storage medium as in claim 24 wherein storing the LUT comprises storing the LUT into a Digital Signal Processor (DSP).

31. A computer readable storage medium as in claim 24 wherein creating an index table comprises utilizing the LUT to create an index table which specifies physical addresses for each file.

32. A computer readable storage medium as in claim 24 wherein the index table in the memory comprises a table of records readable by the processor.

33. A computer readable storage medium as in claim 32 wherein the processor is a Digital Signal Processor.

34. A computer readable storage medium containing executable computer program instructions which when executed cause a method for a processor to write data to a memory, the method comprising:
    receiving a request to write a file to the memory, the memory having a fragmented array of files across a single partition;

determining the size of the file;

writing the file to the memory;

building a look up table (LUT) for the memory;

storing at least temporarily the LUT in the processor;

accessing the LUT in the processor to create an index table which specifies a plurality of addresses for the file;

storing the index table in the memory.

35. A computer readable storage medium as in claim 34 wherein the memory is a flash memory.

36. A computer readable storage medium as in claim 34 wherein the memory is a SmartMedia.

37. A computer readable storage medium as in claim 34 wherein writing the file to the memory comprises searching a file allocation table (FAT) to find empty space within the memory to store the file.

38. A computer readable storage medium as in claim 34 wherein writing the file to the memory comprises allocating empty clusters within flash memory for the file.

39. A computer readable storage medium as in claim 34 wherein writing the file to the memory comprises storing the file in empty clusters in the memory.

40. A computer readable storage medium as in claim 34 wherein building a lookup table comprises parsing the memory's File Allocation Table to find clusters for all files located on the memory.

41. A computer readable storage medium as in claim 34 wherein building a lookup table comprises converting file clusters associated with a file into logical sectors.

42. A computer readable storage medium as in claim 41 wherein building a lookup table further comprises mapping the logical sectors of the files to their corresponding physical sectors.

43. A computer readable storage medium as in claim 34 wherein storing the LUT comprises storing the LUT into a Digital Signal Processor (DSP).

44. A computer readable storage medium as in claim 34 wherein creating an index table comprises utilizing the LUT to create an index table which specifies physical addresses for each file.

45. A computer readable storage medium as in claim 34 wherein the index table in the memory comprises a table of records which can be read by a processor.

46. A computer readable storage medium as in claim 45 wherein the processor is a Digital Signal Processor.

* * * * *